United States Patent

[11] 3,623,508

| [72] | Inventor | Richard Huber<br>Modling near Wien, Austria |
|---|---|---|
| [21] | Appl. No. | 833,412 |
| [22] | Filed | June 16, 1969 |
| [45] | Patented | Nov. 30, 1971 |
| [73] | Assignee | Istag A.G. Suhr/AG<br>Suhr, Aargau, Switzerland |
| [32] | Priority | June 14, 1968 |
| [33] | | Austria |
| [31] | | A 5729/68 |

[54] SHUTOFF VALVE
13 Claims, 3 Drawing Figs.

[52] U.S. Cl. ..................................... 137/630.14,
        137/630.22, 251/191
[51] Int. Cl. ............................................. F16k 11/14
[50] Field of Search........................................ 251/176,
        189, 190, 191, 193, 194; 137/630.13, 630.14,
        630.15, 630.22

[56]                References Cited
            UNITED STATES PATENTS
1,654,517  12/1927  Wilson ........................ 251/190
1,807,970  6/1931   Davis............................ 137/630.14
2,839,265  6/1958   Hobbs .......................... 251/191 X
3,211,418  10/1965  Klinger-Lohr................ 251/187 X
3,211,419  10/1965  Klinger-Lohr................ 251/191 X Primary Examiner—Clarence R. Gordon
Attorney—Waters, Roditi, Schwartz & Nissen ABSTRACT: A shutoff valve comprises a valve casing, a plunger constituted of two parts and carrying an axially compressible sealing ring initially biased between the two parts of the plunger, and a plunger operating spindle arranged for further movement in a closing direction after one of said plunger parts in closing position abuts against a shoulder of the valve casing, to increase the axial bias of the sealing ring. The two parts of the plunger are connected to the operating spindle in axially fixed positions by means of a threaded arrangement and they are elastically deformable upon the further movement of the spindle. The plunger parts are axially biased with respect to one another by adjustment of the members of the threaded arrangement.

PATENTED NOV 30 1971

SHUTOFF VALVE

The present invention relates to a shutoff valve having a plunger piston which, for sealing against the valve casing in closed position, carries at least one axially compressible sealing ring which is axially and elastically biased between two parts of the plunger, and an operating spindle arranged for further movement in a closing direction, when the plunger has arrived in closed position and abuts by one of said plunger parts against a fixed shoulder of the valve casing, whereby the axial elastic bias of the sealing ring is increased.

Such valves have the advantage over prior known plunger piston valves that they are practically maintenance-free because the sealing ring is under elastic compression in any position of the plunger and also remains elastically biased after possible thermally or chemically caused volume changes. In closed position, the sealing ring is additionally elastically compressed, so that a safe seal is ensured, particularly when the valve is under higher temperature stress, and heat expansions occur which are nonuniform at the beginning and at the end of a period of operation.

However, the known valves of the type described above have the disadvantage that their construction is relatively expensive. They have two plunger parts arranged with axial clearance on the valve operating spindle, and which receive the sealing ring, one part of the plunger being intended for cooperation with the fixed shoulder of the casing and the other plunger part being under the influence of a spring supported on the spindle by means of a nut.

An object of the invention is to improve the operational safety and to simplify the construction of the valve of the type mentioned above. The invention is based on the concept of combining the hitherto separate functions of the plunger parts which are movable on the spindle and of the spring which is supported on the spindle, by the provision of two plunger parts which are themselves elastically deformable by the valve operating force.

According to the present invention the two parts of the plunger are connected to the operating spindle so as to be axially fixed with respect to one another, said two parts being themselves elastically deformable by the action of said spindle, and being axially biased one with respect to the other by means of a stressing arrangement. In this way, a valve is obtained which has a two-part plunger fixedly connected to the operating spindle, and nevertheless fulfills the above-mentioned functions of the known multipart plungers having movable plunger parts. The sealing ring is thus subjected to axial elastic compression in any position of the plunger, because both plunger parts are elastically deformed during assembly. Possible shrinkages of the sealing ring may therefore be taken up without substantial decrease in the axial compression. In the closed position of the valve, an additional axial compression of the sealing ring is possible by further moving the valve spindle axially in the closing direction. One part of the plunger has its edge bearing against a fixed shoulder. When the spindle is moved further in an axial direction, the other plunger part is additionally elastically deformed, so that an additional elastic pressure is exerted on the sealing ring; the plunger part abutting against the shoulder of the valve casing first being released upon this further movement of the spindle and then elastically deformed in the opposite direction. When the valve is opened, the two plunger parts return elastically to their original positions, the sealing ring remaining under the compressive stress resulting from the biasing of the two plunger parts towards one another.

The required paths of elastic deformation of the two plunger parts are dependent upon the deformation characteristic of the sealing ring arranged therebetween. For sealing rings which are suitable for high temperatures and usually consist of asbestos (with an organic bonding agent), the further path of movement of the spindle in the closing direction relative to the edge of the plunger part abutting in closed position against the valve casing shoulder, advantageously amounts, under normal operation force, to 2 to 12 percent, and preferably 5 to 10 percent of the original sealing ring height. Assuming that the sealing ring material is the same, the biasing path of the elastic plunger parts advantageously amounts to 5 to 25 percent, and preferably 15 to 20 percent of the original height of the sealing ring, when the plunger parts are axially biased relatively to their point of fixation.

A particularly simple and also operationally safe and cost-saving construction is obtained when one plunger part engaging said fixed shoulder is shaped by a drawing or pressure molding procedure. If this shaped part is annular, the stressing member for biasing the two elastic piston parts must fit into the internal bore of this annular part and a seal must be provided between the annular part and the stressing member. This seal may advantageously be avoided when the plunger part engaging said casing shoulder is made of sheet metal and forms a closed face.

In order to avoid costly detachable connections, the plunger part engaging said shoulder is nondetachably connected to the stressing arrangement which serves for biasing the two elastic parts. The most advantageous constructions are therefore obtained when the nondetachable connection is produced either by welding, soldering or form-closing.

The elastic forces compressing the sealing ring when the valve is closed must be taken up by the plunger part not engaging said casing shoulder. This latter plunger part is therefore advantageously constructed as a plate spring.

The most simple construction is obtained when the stressing arrangement for biasing the two elastic plunger parts is constructed as connection means for connecting the plunger parts to the valve actuating spindle; if the arrangement includes a member rotatable with respect to the spindle, the whole spindle may be made in a single piece without requiring a separation between a nonrotatable shaft and a rotatable threaded part, as is the case in hitherto known constructions. It is particularly advantageous to construct the stressing arrangement as members having a screw connection, because in this case the biasing of the two plunger parts is very easily carried out during assembly.

In order to decrease the required operating force in the case of large valve sizes and/or high pressures, the stressing arrangement cooperating with the end of the actuating spindle may be constructed as a pressure compensating valve. This valve is preferably constructed as a piston slide valve, a sealing ring being provided in the stressing arrangement and the spindle end being constructed as a piston. When the construction is chosen so that the plunger closing movement and the flow through the valve seat are in the same direction, a very simple design is obtained because the correct sequence of the opening and closing movements of the main valve and of the compensating valve occurs automatically.

The invention will now be described in greater detail with reference to the accompanying drawings, in which.

Figure 1:
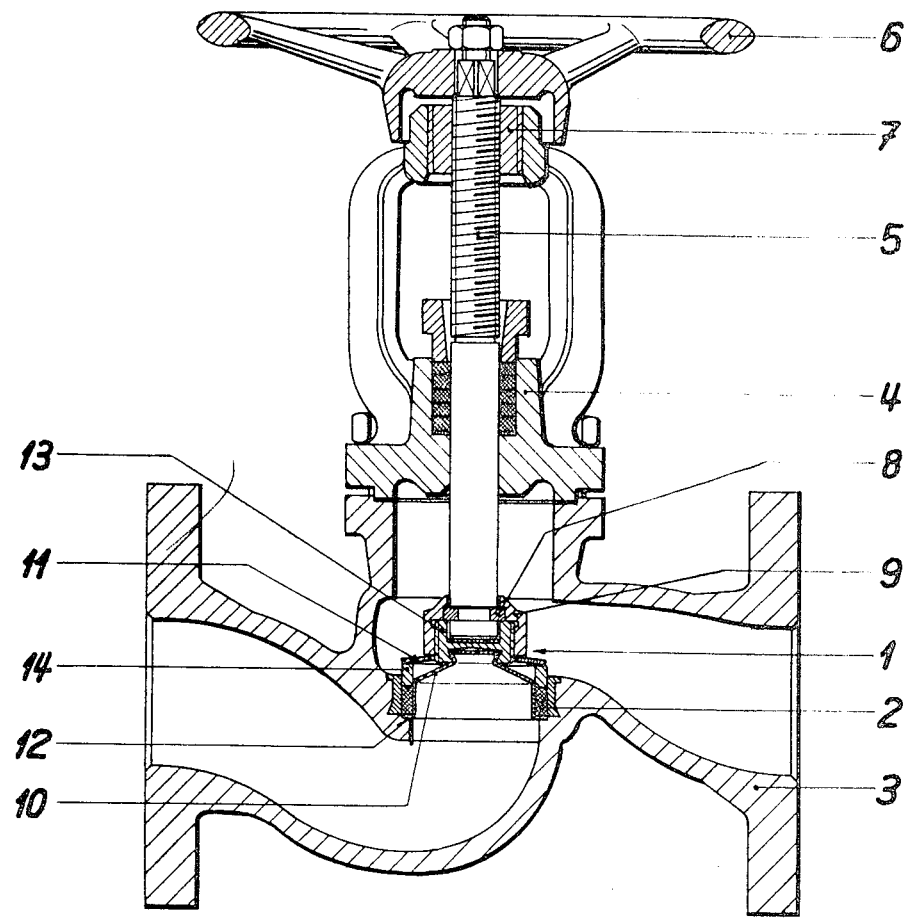
FIG. 1 is a vertical axial section through a simple and robust valve according to the invention.

In the plunger piston valve shown in FIG. 1, the one-part sealing ring 2 arranged in the plunger 1 seals against a valve casing 3, which is closed by a cover member 4. A spindle 5 connected to the plunger 1 penetrates through the cover member 4 and is axially movable upon rotation of a threaded nut 7 engaging a threaded portion of the spindle, by means of a handwheel 6. The plunger 1 connected to the valve spindle 5 by means of a two-part ring 8 and a screwcap 9 essentially comprises two plunger parts 10, 11 and the sealing ring 2. The part 10 cooperating with a fixed shoulder 12 of the valve casing is made of a piece of sheet metal forming a closed surface, so that no sealing is necessary at the point of connection of this part 10 to the valve spindle 5. The sealing ring 2 is engaged on a cylindrical portion of the plunger part. The sheet metal part 10 is positively connected to a threaded sleeve 13 which, in cooperation with the screwcap 9, produces an axially fixed but rotatable connection to the spindle 5. An intermediate ring member 14 is provided on the sealing ring 2 for ensuring a satisfactory compression thereof; the second plunger part 11 bears against the ring member 14 and with its inner periphery against the screwcap 9.

Instead of the positive connection between the plunger part 10 and the threaded sleeve 13, a soldered or welded permanent connection may also be provided. It is also possible to make the plunger part 10 and the threaded sleeve 13 as an integral member by means of a drawing or pressure molding process. The wall thickness of the drawn or molded part may vary in order that this part will be able to fulfill the function of the elastic deformation or the screw connection to the screwcap 9.

Figure 2:
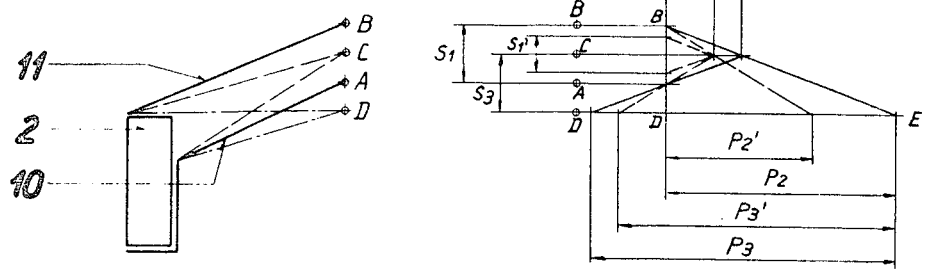
FIG. 2 is a diagram of forces of the plunger of this valve.

The operation of the plunger shown in FIG. 1 may be seen from FIG. 2, in which one half of the plunger is represented schematically. The solid lines designate the two plunger parts 10, 11 and the sealing ring 2 arranged therebetween, in the position before the two parts are compressed. If it is assumed that these conical sheet metal parts form a closed cone, the apices of the cones are located at points A and B. As soon as the two plunger parts are stressed in the region of the axis due to the above-mentioned screw connection, said apices meet at point C (plunger parts shown dashed). As may be seen from the adjacent diagram of forces, the force $P_1$ then acts on the sealing ring, it being assumed that said ring is not deformed by this force. The two points A and B located on the axis are thereby brought together and moved through the path $S_1$. When in the course of the closing movement of the plunger the lower plunger part 10 abuts with its outer edge against the shoulder 12 and the point C is moved further in the closing direction from C to D (path $S_3$) by the actuating spindle 5, the pressure on the valve ring increases to $P_2$. The path $S_3$ can amount to 2–12 percent, and preferably 5 to 10 percent of the height of the ring 2, in the case of sealing rings with a high content of asbestos. The hypotenuse of the triangle BDE therefore represents the progress of the force of pressure acting on the sealing ring, as being a function of the degree of deformation of the two plunger parts. The further force $P_3$ indicates the necessary operating force for obtaining the force of pressure $P_2$, insofar as the force for overcoming the pressure of the medium and the friction during the closing movement is neglected. If it is now desired to take into account the deformation of the sealing ring under the influence of the elastic forces, a diagram of forces as shown in dash-and-dot lines in FIG. 2 is obtained. The pressure forces occurring when the two plunger parts are stressed, elastically compress the sealing ring, so that smaller force constants and consequently a smaller initial stressing force $P'_1$ are produced. Similarly, the force $P'_2$ acting on the ring in closed position when point D is reached, is smaller than in the case of a nondeformable sealing ring. Also the operating force required for reaching point D has changed to $P'_3$. This diagram shows that the sealing ring is constantly under the compressive force $P'_1$ in the piston position, a shrinkage by $S'_1$ being possible before the sealing ring is completely without compression. The small but existing self-elasticity of the sealing ring improves this behavior. In the case of sealing rings having a high content of asbestos, $S'_1$ may amount to 5 to 25 percent, and preferably 15 to 20 percent of the height of the ring. When the lower plunger part 10 abuts on the shoulder 12 and the actuating spindle 5 moves further in the closing direction, the amount of pressure applied to the sealing ring increases further, so that the valve produces a safe sealing and nonuniform heat expansions of the valve casing and the actuating spindle may be safely absorbed. In this way, additionally a certain radial expansion of the plunger part 10 occurs in the region of the sealing ring.

Figure 3:
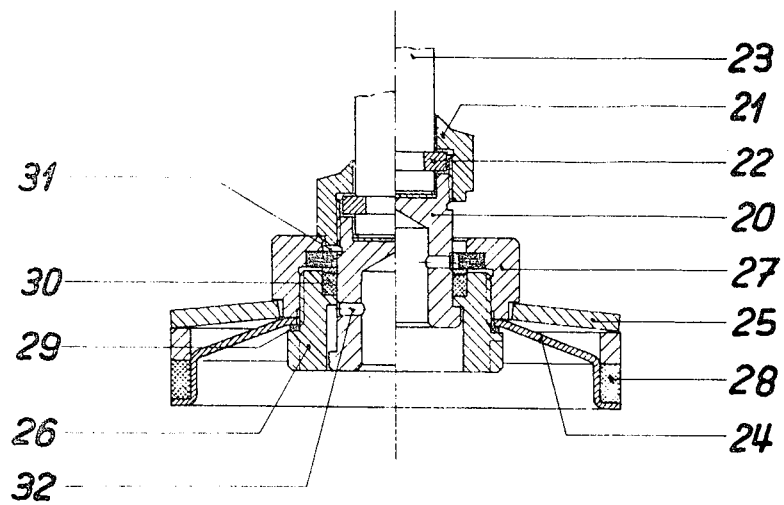
FIG. 3 is a vertical section through a modified plunger of a valve according to the invention having a compensating means.

The modified plunger shown in FIG. 3 is provided with a compensating valve in order to facilitate the actuation of the plunger in the case of large nominal valve sizes or high pressures. This valve comprises a compensating piston 20 which is connected to the spindle 23 by a screwcap 21 and a two-part ring 22. The two elastically deformable plunger parts 24, 25 are fixed in a sleeve 26 by means of a screwcap 27 and carry the biased sealing ring 28 at their outer periphery. Beneath the inner edge of the lower plunger part 24 there is provided a metallic seal 29, because this plunger part does not form a closed surface. A sealing ring 30 is engaged in the sleeve 26 and is under constant compression by a plate spring 31, which is supported on the screwcap 27 of the sleeve. The sealing ring 30 guides the compensating piston 20. The compensating piston is furthermore guided by its enlarged end directly in the sleeve 26, so that the compensating piston is prevented from misalignment while moving. Assuming that the flow of fluid (pressure $p$) through the valve seat and the closing movement of the plunger occur in the same direction, the functioning of this compensating valve is positively ensured in every position of the plunger. In FIG. 3, the piston 20 is shown in closed position in the left half of the Figure, the closing force acting axially on the sealing ring 28 via the spindle 23, the two screwcaps 21, 27 and the upper plunger part 25. Upon opening the valve, first the plunger is held by the pressure $p$ and the force of friction, whereas the compensating piston 20 is lifted until it abuts with its enlarged end on the sleeve 26. In this position (see the right half of the Figure) communication is established between the high pressure and the low-pressure side of the valve via a bore 32 in the compensating piston 20, so that pressure balance will be established. When the spindle is moved further in opening direction, the plunger is lifted off the valve seat by positive transfer of force from the piston 20 to the sleeve 26 and screwcap 27. For closing the valve, the sequence of operations is reversed. First, the bores 32 of the compensating piston 20 are closed by movement of the piston relative to the sleeve 26 and then the whole plunger is pushed into its annular seat, the internal pressure $p$ of the fluid assisting the closing movement.

I claim:

1. A shutoff valve comprising a valve casing, a plunger including two elastic parts and an axially compressible sealing ring elastically biased between said two parts, an operating spindle supported for further movement after abutment of the plunger in a closing position against a shoulder on said valve casing, whereby the axial elastic bias of said sealing ring is increased, connection means connecting said two parts of the plunger to said operating spindle such that said parts are axially fixed with respect to one another, said two parts being themselves elastically deformable by the further movement of said spindle, and means coupled to said parts for axially biassing one with respect to the other.

2. A shutoff valve as claimed in claim 1, wherein in the amount of said further movement of the spindle together with the place of fixing of said plunger parts, in closing direction relative to the edge of one plunger part abutting in closing position against a shoulder of the valve casing amounts, under normal operating force, to 2 to 12 percent, of the original height of the sealing ring.

3. A shutoff valve as claimed in claim 1, wherein the bias path of the elastic plunger parts upon axial biasing relative to the place of fixing of the plunger parts, amounts to 5 to 25 percent, of the original height of the sealing ring.

4. A shutoff valve as claimed in claim 1, wherein the plunger part abutting against said shoulder of the valve casing is shaped sheet metal.

5. A shutoff valve as claimed in claim 1, wherein the plunger part coacting with said shoulder forms a closed surface.

6. A shutoff valve as claimed in claim 1, wherein the plunger part cooperating with the said shoulder is nondetachably connected to said means for biasing the two elastic parts.

7. A shutoff valve as claimed in claim 6, wherein the nondetachable connection comprises a weld.

8. A shutoff valve as claimed in claim 6, wherein the nondetachable connection is form-closed.

9. A shutoff valve as claimed in claim 1, wherein the other plunger part not coacting with said casing shoulder is constructed substantially as a plate-spring.

10. A shutoff valve as claimed in claim 1, wherein the means for biasing the two elastic plunger parts is part of the connection means of the plunger with the operating spindle.

11. A shutoff valve as claimed in claim 10, wherein the means for biassing the plunger parts comprises a member which is rotatable with respect to the operating spindle.

12. A shutoff valve as claimed in claim 1, wherein the means for biasing the plunger parts comprises two elements having a screw connection.

13. A shutoff valve as claimed in claim 1, wherein the means for biassing the plunger parts in cooperation with the end of the operating spindle, forms a pressure compensation valve to facilitate operation in the case of large nominal valve sizes and/or high fluid pressures.

* * * * *